United States Patent [19]

Wike, Jr.

[11] Patent Number: 4,935,610

[45] Date of Patent: Jun. 19, 1990

[54] HAND-HELD BAR CODE READER

[75] Inventor: Charles K. Wike, Jr., Cambridge, Ohio

[73] Assignee: NCR Corporation, Dayton, Ohio

[21] Appl. No.: 284,643

[22] Filed: Dec. 15, 1988

[51] Int. Cl.⁵ .............................................. G06K 7/10
[52] U.S. Cl. .................................... 235/472; 235/462; 362/103
[58] Field of Search ............... 235/375, 385, 419, 462, 235/472; 362/103, 190; 224/219, 267

[56] References Cited

U.S. PATENT DOCUMENTS

| | | | |
|---|---|---|---|
| 1,906,193 | 4/1933 | Vitale | 362/103 |
| 2,356,396 | 8/1944 | Gonseor | 362/103 |
| 3,727,030 | 4/1973 | McMurtry | 235/472 |
| 3,826,900 | 7/1974 | Moellering | 235/472 |
| 3,892,974 | 7/1975 | Ellefson et al. | 250/568 |
| 3,978,318 | 8/1976 | Romeo et al. | 235/472 |
| 4,471,218 | 9/1984 | Culp | 235/472 |
| 4,538,060 | 8/1985 | Sakai et al. | 235/472 |
| 4,570,057 | 2/1986 | Chadima, Jr. et al. | 235/472 |
| 4,639,070 | 1/1987 | Ikeda et al. | 350/3.71 |
| 4,736,095 | 4/1988 | Shepard et al. | 235/472 |
| 4,766,297 | 8/1988 | McMillan | 235/462 |
| 4,766,299 | 8/1988 | Tierney et al. | 235/472 |
| 4,788,631 | 11/1988 | Fuller | 362/103 |
| 4,797,940 | 1/1989 | Sato et al. | 382/9 |

Primary Examiner—Alan Faber
Assistant Examiner—Robert A. Weinhardt
Attorney, Agent, or Firm—Wilbert Hawk, Jr.; Albert L. Sessler, Jr.; Richard W. Lavin

[57] ABSTRACT

A portable optical bar code reader is adapted to be attached to the underside of the wrist of the user for reading coded labels on a purchased merchandise item. A ring member mounted on one of the fingers of the user has an actuating member mounted therein which is actuated by another finger of the user to enable the bar code reader to read a coded label. Scanning device mounted within the bar code reader provide a compact arrangement for generating a scanning light beam which scans the coded label. The bar code reader is attached to the wrist of the user by an easily removable strap member.

8 Claims, 3 Drawing Sheets

HAND-HELD BAR CODE READER

CROSS-REFERENCE TO RELATED APPLICATION

Composite Lens for a Hand-Held Bar Code Reader, co-pending application, NCR Docket No. 4179, U.S. Ser. No. 07/284,646, filed on even date, invented by Charles Wike.

BACKGROUND OF THE INVENTION

This invention relates to laser bar code readers and more particularly to hand-held laser bar code readers.

Present checkout systems found in retail or supermarket stores include a point-of-sale terminal device positioned adjacent a checkout counter which includes an optical scanning device for scanning a bar code pattern on a label attached to a purchased merchandise item. The scanning device generates signals representing the coded data on the label which are used to generate the price of the purchased item. In some checkout systems, a hand-held bar code reader has been utilized where the purchased merchandise items can be easily handled by the checkout operator so as to position the reader adjacent the bar code label on the purchased merchandise item. Prior hand-held bar code readers have required that the operator use one hand to hold the reader while utilizing the other hand to hold the purchased merchandise item in a position allowing the reader to scan the coded label on the item. It would be desirable to have the hand-held reader mounted on the hand of the checkout operator in such a manner as to enable the checkout operator to utilize both hands in moving the purchased merchandise items across the checkout counter while enabling the operator to operate the reader for scanning the coded labels on the purchased merchandise items. This arrangement allows the checkout operation to be completed in a minimal amount of time.

SUMMARY OF THE INVENTION

There is provided a hand-held portable bar code reader comprising an elongated casing having a flashlight configuration with a scanning unit mounted in the front portion of the casing, the casing including a horizontally extending top flat surface portion extending rearwardly from the front edge of the casing against which surface the wrist of the checkout operator supports the casing by a strap secured to the casing. A ring member comprising an on/off switch is mounted on the forefinger of the hand of the operator and operated by the thumb enabling the reader to scan a coded label on a purchased merchandise item which is positioned adjacent the reader. The scanning unit of the bar code reader includes a laser diode for generating a scanning light beam, a pair of reflecting mirrors mounted on a collection mirror positioned on the glass face of the reader with the reflecting mirrors deflecting the laser beams in a direction which is opposite to the direction of the laser beam outputted by the diode and directed toward a rotating reflecting mirror mounted on the shaft of a motor mounted on the center axis of the reader. Mounted around the inside periphery of the front opening of the reader are a plurality of turning mirrors for receiving the light beams from the rotating mirror and projecting the scanning light beams in the form of a scanning pattern at the coded label. The light reflected from the coded label is then redirected through the turning mirrors, the rotating mirror and to the collection mirror which focuses the light beams at a photodetector mounted adjacent the motor. The photodetector converts the scanning light beams into electrical signals which are then transmitted by a transmitter located in the rear portion of the casing to a remote pickup which transmits the signals to a remote processor for decoding and transmitting the resulting data to a remote price lookup table from which the price of the scanned merchandise item is retrieved. Located in the top flat surface portion of the reader is a display which may display information indicating whether the scanning operation resulted in a good or bad read. The handle portion of the casing further includes electrical racks for supporting the electronics associated with the reader, a transmitter and a power supply. There is also provided a plug-in socket allowing the data to be electrically transferred to the remote processor.

It is therefore a principal object of this invention to provide a portable optical bar code reader which can be easily attached to the underside of the wrist of a checkout operator allowing the operator to sort and move the purchased merchandise items on the checkout counter without interference from the optical reader.

It is another object of this invention to provide a hand-held bar code reader which can be conveniently operated by the operator with the bar code reader attached to the undersurface of the wrist of the operator.

It is another object of this invention to provide a bar code reader which is simple in construction and low in cost.

BRIEF DESCRIPTION OF THE DRAWINGS

These and other objects, features and advantages of the invention, as well as the invention itself, will become more apparent to those skilled in the art and in light of the following detailed description taken in consideration with the accompanying drawings wherein like reference numerals indicate like or corresponding parts throughout the several views and wherein.

DESCRIPTION OF THE PREFERRED EMBODIMENT

Figure 1:
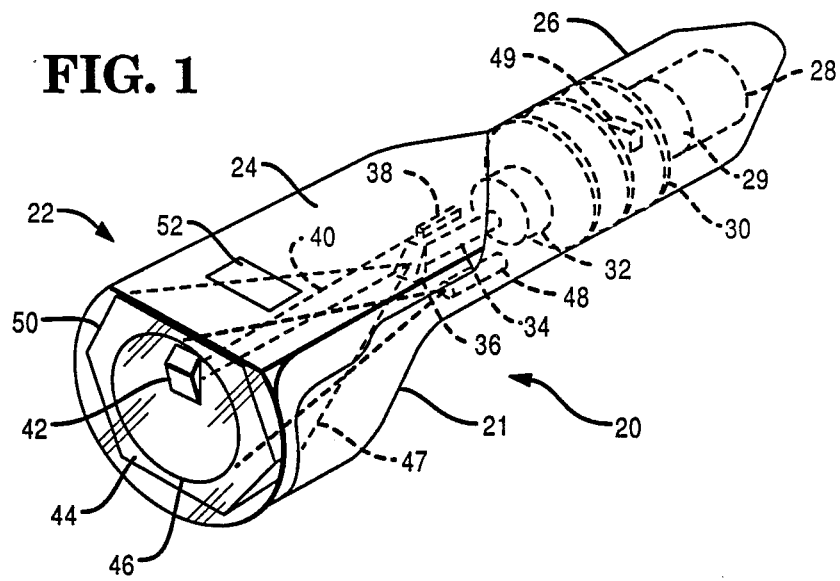
FIG. 1 is a perspective view of the optical bar code reader of the present invention showing details of the scanning unit.

Referring now to FIG. 1, there is shown a perspective view of the optical bar code reader of the present invention generally indicated by the numeral 20 comprising an elongated casing 21 which includes a front portion 22, the top of which comprises a rearwardly extending flat surface 24 which terminates at a handle portion 26 of the reader. The front portion 22 of the reader has a greater diameter than the diameter of the handle portion 26 forming a flashlight type casing (FIG. 2) and includes the optics for projecting light beams in a scanning direction. The handle portion 26 includes a power supply 28, a radio transmitter 29, a series of electrical rack members 30, and a drive motor 32 which rotates a drive shaft 34 having a scanning mirror 36 attached to its end. Located adjacent the shaft member 34 is a laser 38 which may be a laser diode member and which projects a laser light beam 40 along a first axis directed toward a lens member 42 comprising a pair of turning mirrors which turn and project the received light beam in the opposite direction toward the scanning mirror 36 along a second axis which is the axis of the casing and which is parallel to the first axis. Rotation of the scanning mirror 36 deflects the light beam at a plurality of turning mirrors 44 mounted around the inside periphery of the front portion 22 of the housing member 20. In the present application there are six mirrors mounted in the casing. The turning mirrors 44 will deflect the scanning light beams received from the scanning mirror 36 towards a coded label (not shown) on the purchased merchandise item. The light reflected from the coded label is collected by a collection mirror 46 to which the lens member 42 is secured, which lens member focuses the reflected light beams at a photodetector 48 which in turn converts the received light beams into electrical signals. The lens member 42 and the collection mirror 46 are mounted on a glass face member 50 (FIG. 2) mounted in the front portion 22 of the reader 20. The electrical signals generated by the photodetector 48 are transmitted to a processing member 49 mounted on one of the electrical rack members 30 which decodes the electrical signals producing data which is used to address a lookup table located in a remote processing unit (not shown). The transmitter 29 may transmit the data to a remote pickup from which the data may be transferred to the remote processing unit. Located in the flat surface 24 of the casing 21 is a display panel 52 which may display information indicating whether there was a good or bad read operation performed by the last scanning operation in a manner that is well known in the art.

Figure 2:
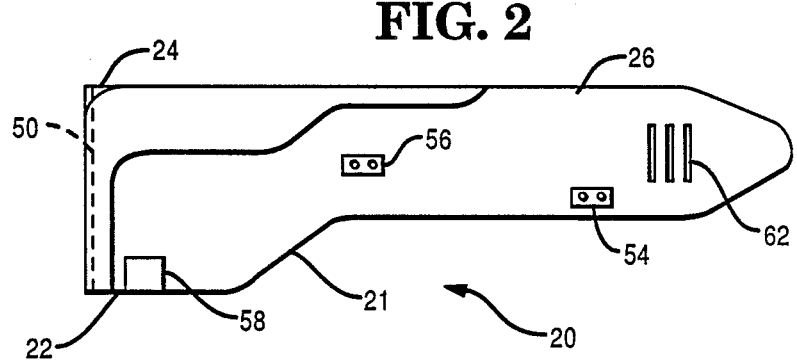
FIG. 2 is a side view of the optical bar code reader of the present invention showing the location of the plug-in sockets associated with the control ring and the transfer of data from the bar code reader together with the strap connection.
Figure 4:
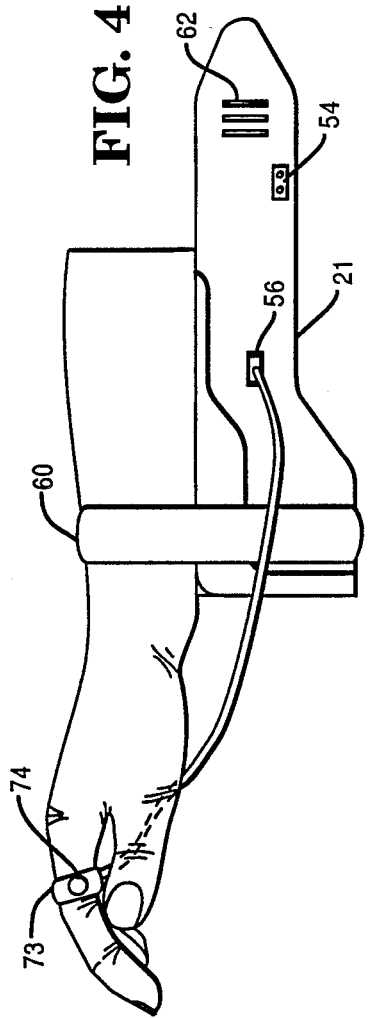
FIG. 4 is a pictorial representation showing the optical bar code reader attached to the wrist of the checkout operator by means of a strap and the control ring mounted on a finger of the operator.
Figure 5:
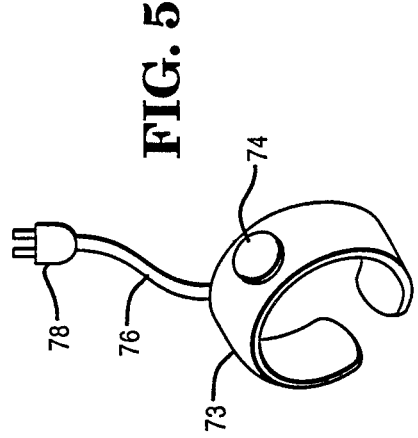
FIG. 5 is a perspective view of the control ring comprising an on/off switch which is worn on the forefinger of the hand of the operator and operated by the thumb of the operator.

Referring to FIG. 2, there is shown a side view of the optical bar code reader 20 which includes a first plug-in socket 54 for accommodating a communication cable for transferring the data generated by the processing member 49 in the reader to a remote processing unit (not shown) for performing a price lookup operation and a second plug-in socket 56 to which is attached a remote switch member in the form of a ring 73 (FIG. 5) and actuated by the checkout operator for operating the bar code reader in a manner to be described more fully hereinafter. There is further located on the lower edge of the front portion 22 of the bar code reader an attachment member 58 which may be used with a velcro type strap member 60 (FIG. 4). Located at the rear end of the handle portion 26 is an audible tone port 62 in which tone signals are generated indicating whether the scanning operation has resulted in a good or bad reading of the coded label.

Figure 3:
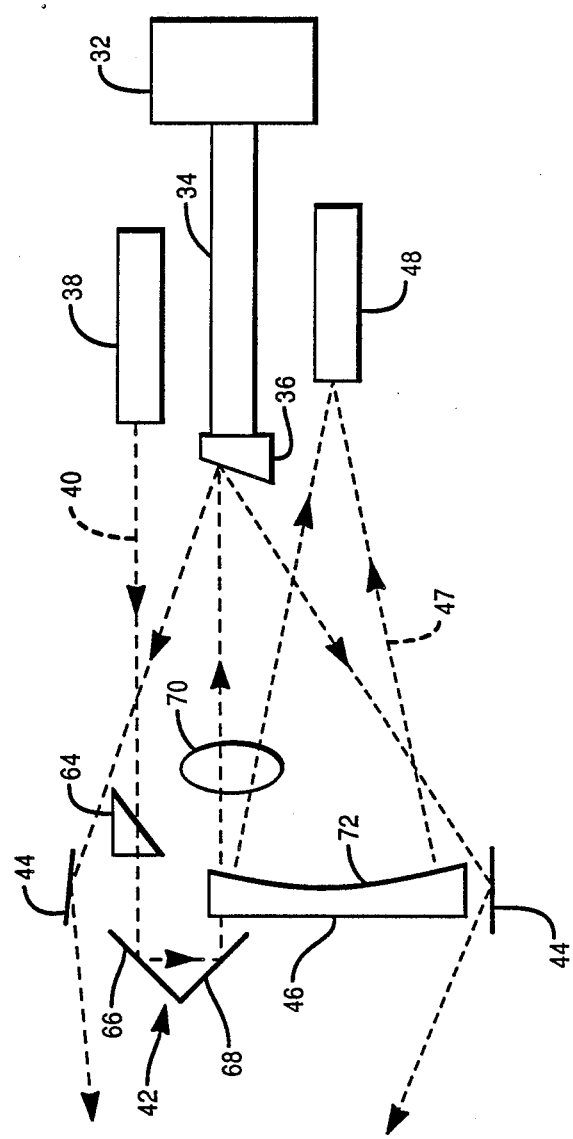
FIG. 3 is a diagrammatic view of the elements comprising the scanning unit associated with the optical bar code reader of the present invention.

Referring now to FIG. 3, there is shown a diagrammatic representation of the elements comprising the scanning unit associated with the present invention which includes a motor 32 rotating the drive shaft 34 with the scanning mirror 36 attached to the end of the shaft member. Mounted adjacent the shaft member 34 are the laser diode member 38 and the detector member 48. The collimated, asymmetric laser light beam 40 outputted by the laser diode member 38 is transmitted through an anamorphic prism 64 which elongates the beam in one direction to circularize the beam and directs the light beam along a first axis to the lens member 42 comprising the turning mirrors 66, 68 from which the light beam is directed in the opposite direction along the axis of the casing 21 through a focusing lens 70 which focuses the light beam on the surface of the scanning mirror 36. Rotation of the scanning mirror 36 directs the light beam 40 at six turning mirrors 44 which reflect the scanning light beam at the coded label in the form of a plurality of scan lines (not shown) for scanning the coded label. The reflected light beams from the coded label are then collected by the vertical surface of the collection mirror 46 with the concave surface 72 directing the light beams 47 toward the detector 48 which in turn generates electrical signals in accordance with the intensity level of the light beams received from the collection mirror 46.

Referring now to FIG. 4, there is shown a pictorial view of the bar code reader positioned adjacent the undersurface of the checkout operator's wrist in which the strap 60, which may be of velcro construction, secures the wrist to the optical bar code reader. The strap 60 is secured to the casing 21 at the attachment member 58 (FIG. 2). Mounted on the forefinger of the operator is a ring member 73 (FIG. 5) having a button portion 74 extending outwardly from the ring which, when depressed by the thumb of the checkout operator, will operate the bar code reader for a scanning operation. The ring member 73 (FIG. 5) is attached to a electrical wire 76 which terminates in the plug 78 which is inserted in the plug socket 56 (FIG. 2) of the bar reader 20 enabling the ring to control the operation of the bar code reader.

It will be seen from this construction that the bar code reader can be attached to the wrist of the operator allowing the operator to have both hands free for sorting and positioning purchased merchandise items on the checkout counter in a scanning position thereby minimizing the time it takes for a scanning operation to occur.

While the salient features of the invention have been illustrated and described, it should be readily apparent to those skilled in the art that many changes and modifications can be made in the invention presented without departing from the spirit and true scope of the invention. Accordingly, the present invention should be considered as encompassing all such changes and modifications of the invention that fall within the broad scope of the invention as defined by the appended claims.

What is claimed is:

1. A hand-held optical bar code reader comprising:
   an elongated casing member having a front edge and a rear edge and including a first cylindrical portion, and a second cylindrical portion having a diameter greater than the first cylindrical portion;
   scanning means mounted in said second cylindrical portion for scanning a coded label on a purchased merchandise item positioned adjacent the second cylindrical portion;
   means secured to said second cylindrical portion for mounting the casing member to the underside of a wrist of a checkout operator; and
   switch means mounted on one of the fingers of the checkout operator adapted to be actuated by another finger of the operator to operate the scanning means.

2. The bar code reader of claim 1 in which said casing member includes a flat portion extending from an upper front edge of the casing member towards the rear edge of the casing member against which the underside of the wrist of the checkout operator is positioned, said bar code reader further including a strap member secured to the second cylindrical portion of the casing for holding the bar code reader against the underside surface of the wrist of the checkout operator.

3. The bar code reader of claim 1 in which said switch means includes a ring member.

4. The bar code reader of claim 3 in which the ring member includes an actuating member extending outwardly from the surface of the ring member and adapted to operate the scanning means when depressed.

5. The bar code reader of claim 4 in which the casing member further includes an electrical socket member coupled to the scanning means, said switch means further including an electrical cable connecting the socket member to the actuating member on said ring member enabling the actuating member to operate the scanning means when depressed.

6. The bar code reader of claim 5 in which said scanning means include means for outputting a scanning light beam, optical means for directing the scanning light beam along a first predetermined path, a motor driven drive shaft mounted in said first cylindrical portion and in said first predetermined path, a first mirror mounted on said drive shaft for deflecting said scanning light beam along a plurality of second predetermined paths and a plurality of second mirrors mounted around the periphery of the interior of the second cylindrical portion of the casing member and in said second predetermined path for deflecting the scanning light beam in a scanning direction.

7. The bar code reader of claim 6 in which said means for outputting a scanning light beam comprises a laser.

8. The bar code reader of claim 7 in which said laser is a laser diode.

* * * * *